April 26, 1966   R. G. GRIFFIN ET AL   3,248,613
HERMETIC SEAL FOR ELECTRICAL DEVICE
Filed April 25, 1962   2 Sheets-Sheet 1

INVENTORS.
WILLIAM J. HYLAND
BY RUDOLPH G. GRIFFIN

ATTORNEY

April 26, 1966   R. G. GRIFFIN ETAL   3,248,613
HERMETIC SEAL FOR ELECTRICAL DEVICE
Filed April 25, 1962   2 Sheets-Sheet 2

INVENTORS.
WILLIAM J. HYLAND
RUDOLPH G. GRIFFIN
BY
ATTORNEY

United States Patent Office 3,248,613
Patented Apr. 26, 1966

3,248,613
HERMETIC SEAL FOR ELECTRICAL DEVICE
Rudolph G. Griffin, Santa Clara, and William J. Hyland, Palo Alto, Calif., assignors to International Telephone and Telegraph Corporation, Nutley, N.J., a corporation of Maryland
Filed Apr. 25, 1962, Ser. No. 190,060
12 Claims. (Cl. 317—230)

This invention is related to electrical devices and, more particularly, to seals for electrical devices to prevent loss of vapor or fluid therefrom, such as the electrolyte in the case of electrolytic capacitors, for example. The invention, however, may be applied to other electrical devices where an hermetic seal is required.

The invention is particularly adapted for devices containing sulphuric acid or similar chemical solutions or compositions in the form of gels or thixatropic mixtures wherein vapor or the fluid content thereof has an exceptional surface creepage characteristic. Heat generated in such devices as electrolytic capacitors not only increases presssure within the capacitor housing but also increases the tendency of the electrolyte to creep through any fine crevices that may exist or develop in the closure structure. It has been found that electrolytic capacitors heretofore proposed, even though they are hermetically sealed at the time of original manufacture, eventually deteriorate and tend to lose their electrolyte after being placed in operation for extended periods of time. This is believed due to the numerous temperature cycles to which the capacitors are subjected. These alternate expansion and contraction cycles cause a weakening of the bond between the insulating sealing material, the anode lead, and the metal housing, the latter usually forming the cathode electrode which, for example, may be made of silver or copper having a positive coefficient of thermal expansion, which is one of the main factors affecting the original bond.

An object of this invention therefore is to provide an improved hermetic seal for electrical devices such as electrolytic capacitors and the like where there is a real need for preventing loss of vapor or fluid therefrom.

Another object of this invention is to provide a seal for an electrolytic capacitor which remains hermetically tight during repeated thermo-cycling periods as the capacitor is alternately energized and de-energized.

An important structural feature of the invention is the provision of a resilient insulating seal having a chamber with a reserve supply of fluid sealing medium therein in communication with the interfaces of the insulation and metal parts of the device. This reserve supply of fluid sealing medium allows for a breathing function during repeated changes in temperature and pressure within the device, while at the same time it prevents the electrolyte or other fluid from creeping completely through the seal.

A further feature of the invention is the provision of a ring or cap of material having a negative coefficient of thermal expansion so disposed over the insulating body of the seal to balance the expansive and contractive forces exerted by the wall portions of the silver cathode housing which are arranged to grip the insulating body.

For a further understanding of the principles of the invention, reference is made to the following description of the accompanying drawings, in which.

Figure 1:
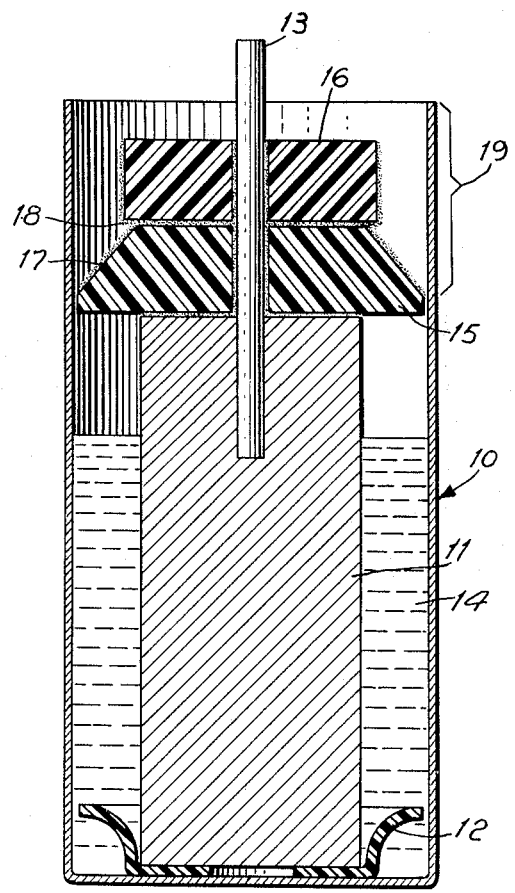
FIG. 1 is a view in vertical cross-section of an electrolytic capacitor containing the components of the hermetic seal of this invention prior to the final assembly and sealing operation.

Referring to FIG. 1 of the drawings, an electrolytic capacitor is shown with the parts assembled prior to completion of the seal. The capacitor comprises a cathode 10, preferably of silver in the form of a cylindrical housing closed at one end and open at the other, a porous anode 11, preferably of tantalum supported at the bottom of the cathode by an insulating disc or basket 12, the anode having a lead 13 also of taantalum, extending from the upper end thereof. Before the anode is placed in the cathode housing a measured amount of electrolyte 14 is deposited therein. For the purpose of sealing the upper end of the cathode, a body of resilient insulation in the form of rings 15 and 16 are positioned on the lead 13. These rings and disc 12 may be made of a synthetic plastic, such as polyetetrafluoroethylene, known as "Teflon," or polytrifluoethylene, known as "Kel-F." Prior to positioning the ring 15 on the lead 13 the lead and the upper end surface of the anode are coated with a layer of a sealing medium 17 known as "Vistanex" which comprises polyisobutylene thinned with a solvent. The ring 15 is then placed on the lead 13 and it is also coated with the sealing medium after which the ring 16 is applied. If sufficient sealing medium has been placed on ring 15 it will not be necessary to apply a coating to the perimeter of the ring 16. However, it is usually advisable to apply medium to the ring 16 to insure an ample supply of the sealing medium for the chamber 20 formed by the recess 18.

Figure 2:
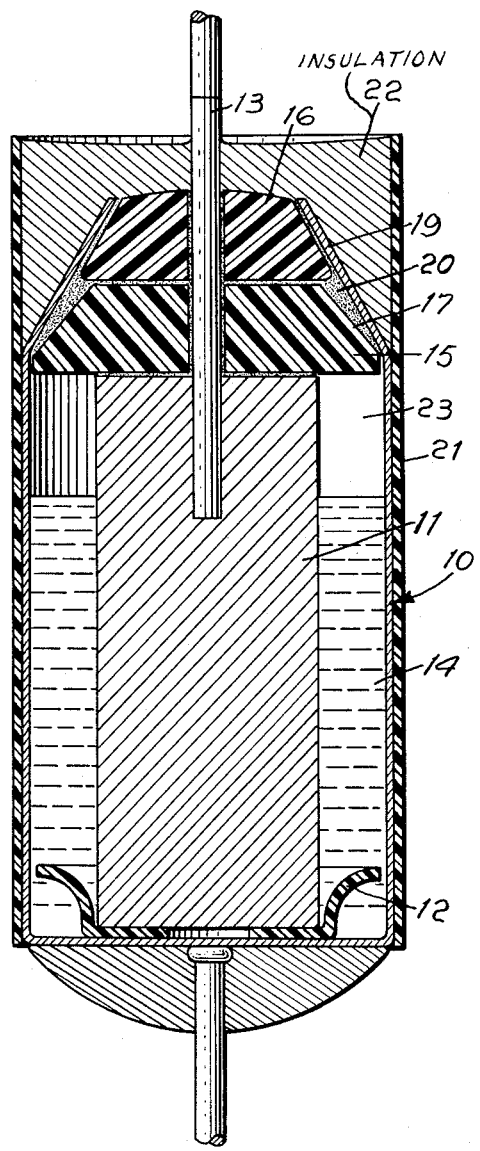
FIG. 2 is a view of the electrolytic capacitor shown in FIG. 1 after the seal is completed.

When the parts have been assembled as shown in FIG. 1, the upper wall portion 19 of the cathode housing is spun inwardly to an angle of approximately 60° as shown in FIG. 2. This spinning action causes the wall portion 19 to compress the rings 15 and 16 as indicated leaving a chamber 20 which acts as a reservoir for the sealing medium 17 which now completely coats the interfaces of the wall portion 19 and the adjacent surfaces of the rings 15 and 16. The coating also extends between the interfaces of the two rings and along the surface of the lead 13.

The seal is completed by placing an insulating sleeve 21 of sturdy plastic material such as "Mylar" over the cathode. The space between the upper portion of the sleeve and the tapered wall portion 19 and the lower portion of lead 13 is filled with material 22 preferably of epoxy resin prepared to have a negative coefficient of thermal expansion corresponding substantially to the positive coefficient of thermal expansion of the silver or other material of which the cathode is formed. By means of this cap-like backing the wall portion 19 is prevented from moving during changes of temperature due to operation or environment.

Pressures that build up within the capacitor during operation are minimized by the ability of the air or gas in space 23 to compress. Variations in pressure tend to force the sealing medium along the interfaces of the seal but the supply in the chamber 20 compresses and prevents seepage of electrolyte. When the pressure is reduced the sealing medium 17 expands and expells substantially all the vapor or liquid that may have worked into the interface between the ring 15 and the wall portion 19. Experiments have shown that this seal is truly hermetic and does not become loosened over long periods of use. This success of the seal is credited to the provision of the reservoir chamber 20 containing a supply of sealing medium and the provision of the negative coefficient material 22 which prevents movement of the wall portion 19 when subjected to repeated changes in temperature.

It should be noted in reference to FIG. 1 that the rings 15, 16 which make up the body of resilient material sealing the open end of the cathode housing are of different forms such that the two when compressed by the wall portion 19 define chamber 20 which functions as a reservoir for the sealing medium. The bottom face of the ring 16 is larger than the upper face of the ring 15 so that when the wall portion 19 is spun over onto the rings, a chamber is provided which receives the surplus sealing medium coating the rings.

Figure 3:
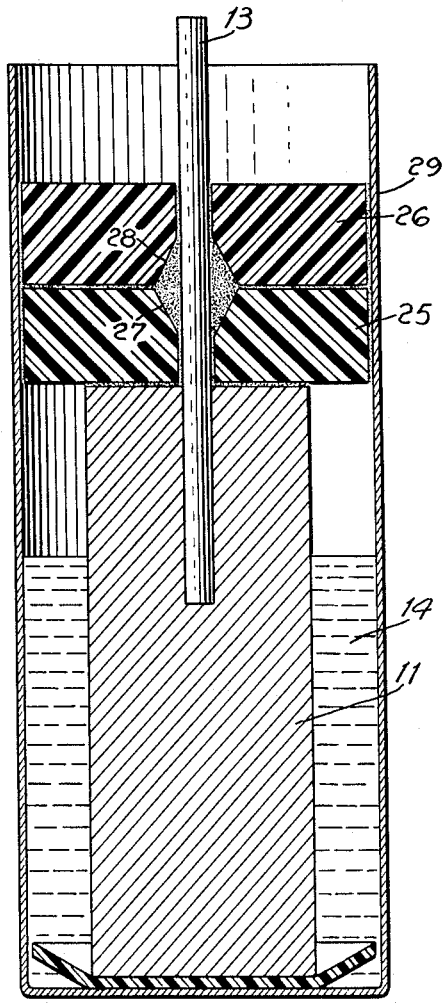
FIG. 3 is a view in vertical cross-section of an alternate embodiment of a seal prior to the final assembly operation.
Figure 4:
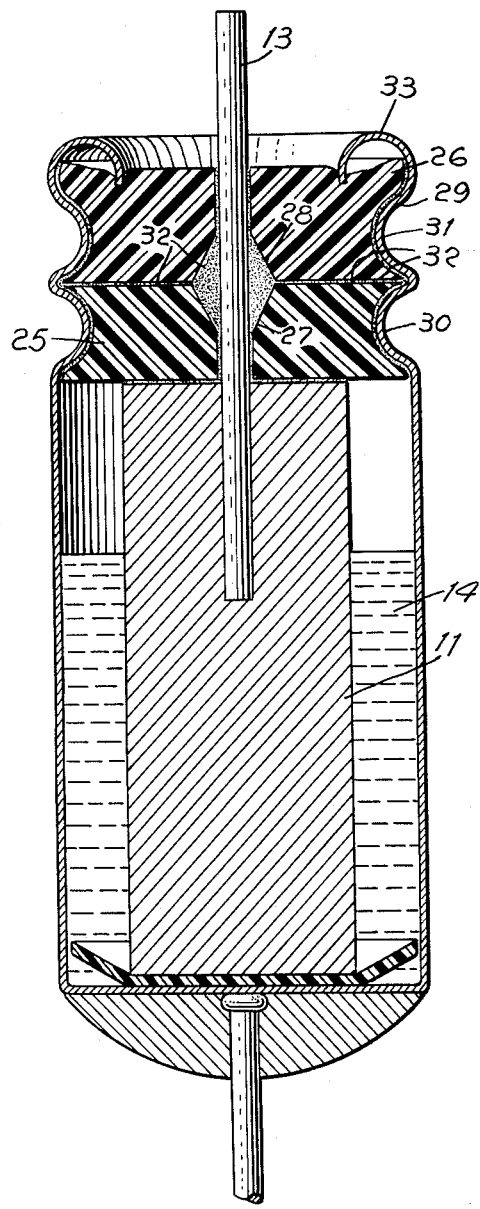
FIG. 4 is a view of the seal shown in FIG. 3 after completion thereof.

Referring to FIGS. 3 and 4 a further embodiment is illustrated showing a seal in which a resilient body is also made up of two rings 25 and 26. These rings are shown to be of corresponding shapes and sizes wherein a conical recess is provided in each as indicated at 27 and 28. The sealing medium is painted onto the stem 13 and to the upper surface of the anode 11 the same as in the case of the embodiment of FIGS. 1 and 2. The first ring 25 is then placed onto the lead 23 and the periphery and upper surface thereof is painted, depositing a quantity of the medium in the conical recess 27 surrounding the stem 13. The second ring 26 is then placed on the stem and if desired the periphery thereof may also be painted with the sealing medium, however, this is not essential, since the sealing medium will be forced up into the interfaces between the ring 26 and the adjacent wall portion 29 when the wall portion is indented into the peripheral edges of the rings as indicated in 30, and 31, FIG. 4. This gripping pressure by a wall portion 29 compresses the rings 25 and 26 so as to reduce the chamber 27, 28 slightly as indicated in FIG. 4. The sealing medium 32 fills the chamber 27, 28 and the spaces between the interfaces of the rings 25 and 26 and between the rings and the surfaces of the lead 13 and also the surfaces of the wall portion 29. In this form the tendency of acid and other vapor to seep through the interfaces is more pronounced along the lead 13 than it is along the surface of wall 29. However, the reservoir of sealing medium contained in the chamber 27, 28 which surrounds the lead 13 prevents this seepage.

In this embodiment the negative coefficient material 22 need not be employed. Instead, the upper end of the wall portion 29 is spun over forcing it into the upper surface of the ring 26 as indicated at 33, thus providing a vertical compressive gripping action in conjunction with the circumferential gripping action of the indentation beads 30, 31 on rings 25 and 26.

While the body of insulating material is shown to comprise two pieces in the embodiments illustrated, it will be obvious that the body could be made in one piece with a suitable chamber for the sealing medium. Thus, it is to be understood that the present illustrations are to be regarded as illustrative only and that many variations and modifications may be made without departing from the principles of the invention herein disclosed and defined by the appending claims.

We claim:

1. An electrical device having a housing containing fluid and a hermetic seal to prevent seepage of said fluid from said housing, said seal comprising an irregularly shaped body of resilient material disposed in the open end of said housing, the end wall portion of said housing gripping said irregularly shaped body with compressive force and thereby causing a chamber to be formed, wherein the walls of said chamber are comprised of a section of the outer surface of said irregularly shaped body and a section of said end wall portion, and a fluid sealing medium in said chamber and between said body and said end wall portion.

2. An electrical device according to claim 1, wherein said body is composed of two parts shaped to provide said chamber therebetween.

3. An electrical device according to claim 1, wherein said body is composed of two parts and the adjacent areas thereof are different in size so as to provide said chamber at the circumferential junction of said two parts and the adjacent wall of said housing.

4. An electrical device according to claim 1, wherein said medium comprises polyisobutylene and a solvent.

5. An electrical device according to claim 1, wherein said housing is of a material having a positive coefficient of thermal expansion and the wall portion thereof is turned inwardly to grip said body, said device further including a cap covering said wall portion, said cap being of a material having a negative coefficient of thermal expansion corresponding substantially to said positive coefficient.

6. An electrolytic capacitor comprising a cylindrical cathode, closed at one end and open at the other end, an anode having a lead extending out the open end thereof, electrolyte contained in said cathode, an irregularly shaped body of resilient insulation disposed about said lead, the end wall portion of said cathode gripping said irregularly shaped body with compressive force and thereby causing a chamber to be formed, wherein the walls of said chamber are comprised of a section of the outer surface of said irregularly shaped body and a section of said end wall portion, and a fluid sealing medium in said chamber and between said body and end wall portion.

7. An electrolytic capacitor according to claim 6, wherein said end wall portion is turned inwardly to present a taper, said capacitor further having a sleeve of insulation on said cathode, and a ring of resinous material is disposed in the space between said sleeve and the tapered wall portion of said cathode.

8. An electrolytic capacitor according to claim 7 wherein said resinous material comprises an epoxy resin.

9. An electrolytic capacitor according to claim 6 wherein said end wall portion is turned inwardly against said body circumferentially thereof.

10. An electrolytic capacitor according to claim 6, wherein said body is composed of two rings, one adjacent to the other, the juxtaposed surfaces of which are of different size so that when gripped by said end wall portion said chamber is provided at the junction of said surfaces and the adjacent surface of said end wall portion.

11. An electrolytic capacitor according to claim 6, wherein said body is composed of two rings one upon the other, and the juxtaposed surface of one of said rings is provided with a recess therein adjacent to the other ring to provide said chamber therebetween.

12. A wet electrolytic capacitor comprising in combination an anode of film-forming metal, a cathode formed from a metal having a positive coefficient of thermal expansion and acting as the capacitor housing, an electrolyte interposed between and in contact with said anode and cathode, an insulating spacing structure separating said anode and cathode and forming a seal therebetween, said structure resting upon said anode, and a compression ring of an epoxy resin surrounding that portion of said cathode adjacent said seal, said epoxy resin having a coefficient of thermal expansion substantially inverse to that of said cathode.

References Cited by the Examiner

UNITED STATES PATENTS

| | | | |
|---|---|---|---|
| 2,224,307 | 12/1940 | Linder | 317—230 |
| 2,891,362 | 6/1959 | Bettridge | 317—242 X |
| 2,944,196 | 7/1960 | Peck | 316—230 |
| 3,056,072 | 9/1962 | Schroeder | 317—230 |

JOHN W. HUCKERT, *Primary Examiner.*

JAMES D. KALLAM, *Examiner.*